(12) United States Patent
Alvin et al.

(10) Patent No.: US 6,273,925 B1
(45) Date of Patent: Aug. 14, 2001

(54) FILTER ASSEMBLY FOR METALLIC AND INTERMETALLIC TUBE FILTERS

(76) Inventors: Mary Anne Alvin, 113 Lehr Ave., Pittsburgh, PA (US) 15223; Thomas E. Lippert, 3205 Cambridge Rd.; Gerald J. Bruck, 4469 Sardis Rd., both of Murrysville, PA (US) 15668; Eugene E. Smeltzer, R.D. 7, Box 267-I, Italy Rd., Export, PA (US) 15632-9621

( * ) Notice: Subject to any disclaimer, the term of this patent is extended or adjusted under 35 U.S.C. 154(b) by 0 days.

(21) Appl. No.: 09/393,561

(22) Filed: Sep. 10, 1999

(51) Int. Cl.[7] .............................. B01D 35/18; B01D 39/20
(52) U.S. Cl. .............................. 55/282.2; 55/502; 55/508; 55/523
(58) Field of Search .............................. 55/382.2, 341.1, 55/484, 502, 508, 523; 95/288

(56) References Cited

U.S. PATENT DOCUMENTS

| | | | |
|---|---|---|---|
| 4,758,272 | * 7/1988 | Pierotti et al. | 55/53 |
| 5,185,019 | 2/1993 | Haldipur et al. | 55/378 |
| 5,433,771 | 7/1995 | Bachovchin et al. | 95/280 |
| 5,474,586 | 12/1995 | Eaton et al. | 55/341.1 |
| 5,876,471 | 3/1999 | Lippert et al. | 55/341.1 |
| 5,925,156 | * 7/1999 | Motoki et al. | 55/523 |

FOREIGN PATENT DOCUMENTS

3941698 * 6/1991 (DE) .............................. 55/523

* cited by examiner

Primary Examiner—David A. Simmons
Assistant Examiner—Robert A. Hopkins

(57) ABSTRACT

A filter assembly (60) for holding a filter element (28) within a hot gas cleanup system pressure vessel is provided, containing: a filter housing (62), said filter housing having a certain axial length and having a peripheral sidewall, said sidewall defining an interior chamber (66); a one piece, all metal, fail-safe/regenerator device (68) within the interior chamber (66) of the filter housing (62) and/or extending beyond the axial length of the filter housing, said device containing an outward extending radial flange (71) within the filter housing for seating an essential seal (70), the device also having heat transfer media (72) disposed inside and screens (80) for particulate removal; one compliant gasket (70) positioned next to and above the outward extending radial flange of the fail-safe/regenerator device; and a porous metallic corrosion resistant superalloy type filter element body welded at the bottom of the metal fail-safe/regenerator device.

10 Claims, 4 Drawing Sheets

FILTER ASSEMBLY FOR METALLIC AND INTERMETALLIC TUBE FILTERS

GOVERNMENT CONTRACT

The Government of the United States of America has rights in this invention pursuant to Contract No. DE-AC26-98FT40002, awarded by the United States Department of Energy.

BACKGROUND OF THE INVENTION

1. Field of the Invention

This invention relates generally to hot-gas cleanup systems and more particularly to a filter assembly that includes an all metal fail-safe/regenerator device, a metal filter housing and a metallic type filter element, that requires only a single particulate barrier seal and allows ease of attachment of the fail-safe/regenerator device to the filter housing.

BACKGROUND INFORMATION

Modern industrial methods have resulted in a need for an apparatus that is capable of efficiently filtering high temperature combustion gases containing particulate material. In combustion turbine applications, for example, a combustion turbine uses energy generated from hot pressurized combustion gases produced by burning natural or propane gas, petroleum distillates or low ash fuel oil. When coal and other solid fuels are burned, particulates carried over from the combustion of such solid fuels can cause turbine blade erosion and fouling. An efficient system for filtering of such hot combustion gases would permit the use of such solid fuels. As another example, in conventional boiler operations, the boilers undergo routine shutdown for cleaning the fireside surfaces and for inspection. An efficient hot gas filtering system would greatly extend the life and operational time for a boiler to operate between inspections. Fouling of the fireside surface due to ash deposition and corrosion would be eliminated or minimized.

Also, as a key component in advanced coal-or biomass-based power applications, hot gas filtration systems protect the downstream heat exchanger and gas turbine components from particle fouling and erosion, cleaning the process gas to meet emission requirements. When installed in either pressurized fluidized-bed combustion plants, pressurized circulating fluidized-bed combustion plants, or integrated gasification combined cycle plants, lower downstream component costs are projected, in addition to improved energy efficiency, lower maintenance, and elimination of additional expensive fuel or flue gas treatment systems. As a critical component, long-term performance, durability, and life of the filter elements and associated high temperature gasket seals are essential to the successful operation of hot gas filtration systems in advanced combustion and gasification applications.

U.S. Pat. Nos. 5,185,019 and 5,433,771 (Haldipur et al. and Bachovchin et al., respectively) disclose a thick walled hot gas candle filter mounting assembly. U.S. Pat. No. 5,474,586 (Eaton et al.) discloses a thin walled hot gas candle filter mounting assembly, and discusses gasket assemblies generally. U.S. Pat. No. 5,876,471 (Lippet et al.), provides a filtering apparatus that can filter aggressive, high temperature, high pressure gases, having an improved, double gasket assembly that can be employed with a conventional ceramic candle filter and a thin walled filament wound ceramic composite. There, both the topmost and bottom gaskets consist of a two component system, made of an interior ceramic fibrous mat filler in compliant annular form covered by a short sheet of a woven or braided sleeving surrounding or encasing the mat filler, which sleeving is stitched together on the outside diameter of the gasket. This system, however, uses a complicated series of sleeving and gaskets. Additionally, U.S. Ser. No. 09/263,436 filed on Mar. 4, 1999 (99P7487US, Alvin et al.) provided an improved gasketing assembly, with an optional fail-safe/regenerator, and described possible use of metallic filter elements having the same connection and configuration as standard ceramic candle filers.

Experience has shown that oxidation of non-oxide-based, ceramic, monolithic, continuous fiber reinforced ceramic composites ("CFCC"), and reticulated foam ceramic matrices, has resulted when these materials are used in the construction of porous candle filter elements which experienced long-term field operation of 500–3000 hours of pressurized fluidized-bed combustion or pressurized circulating fluidized-bed combustion. Similarly, oxide-based monoliths were shown to be susceptible to thermal fatigue and/or shock during process operation. Oxide-based, ceramic CFCC and ceramic filament wound matrices were also shown to have low strength semi-densified flanges; have low strength and load bearing filter bodies; have the potential for embrittlement of the contained CFCC fibers; and to debond along inverted plugs, seams, applied membranes, component layers, and the like.

As a result, there is a need to develop use of other filter element materials and better and simpler connections within the filter assembly for advanced coal-fired and other higher temperature operation applications, that would be resistant to combinations of sulfur and steam contact at high temperatures. There is also a need for improved heat transfer from incoming cold gas flowing into the filter elements during back pressure cleaning operations. Finally, it would be desirable that any improved filter assembly be able to substitute into existing systems in the field.

SUMMARY OF THE INVENTION

Therefore, it is a main object of this invention to provide an improved filter assembly and fail-safe/regenerator device having strengthened, non-brittle, toughened filter elements that are resistant to sulfur, alkali, chlorides, and other contaminants found in steam laden coal gas.

It is a further object to improve heat transfer efficiency of the filter assembly during cleaning operations and provide a design that can easily substitute into existing units.

These and other objects are accomplished by providing a filter assembly for holding a filter element within a hot gas cleanup system pressure vessel, the filter element including a porous metallic type body having two opposing ends, one defining a weldable open end and the other defining a closed end; the filter element body having a uniform diameter, said filter assembly comprising:

(a) a filter housing, said filter housing having a certain axial length and having a peripheral sidewall, said sidewall defining an interior chamber;

(b) a one piece, all metal, fail-safe/regenerator device, having a top and bottom end, disposed within the interior chamber of the filter housing, extending beyond the axial length of the filter housing, said device containing an outward extending radial flange near the top of the device within the filter housing, for seating an essential sealing means, the device also having heat transfer media disposed between a screening means at the top of the device within the filter housing and a screening means at the bottom of the device;

(c) one essential sealing means consisting of one compliant gasket separate and apart from the filter housing, said compliant gasket positioned next to and above the outward extending radial flange of the fail-safe/regenerator device said gasket effective to provide a seal between the filter housing and the fail-safe/regenerator device; and (d) a porous metallic corrosion resistant superalloy type filter element body welded at the bottom of the metal fail-safe/regenerator device outside of the filter housing.

The invention also resides in a metal fail-safe/regenerator device with a welded metallic-type filter element as set forth in b. and d. above. A metal adapter ring may be used to mate and form a better weld between the porous filter element and the fail-safe/regenerator device. Such a design provides increased volume within the fail-safe/regenerator device for heat transfer during cleaning, utilizes a very strong essentially all metal type design with a metal type porous filter made of a superalloy which is corrosion resistant in porous form in the presence of steam, alkalis, chlorides, and allows quick and easy repairs in the field, being compatible with most prior art units. These filter assemblies have no ceramic components and so have less problems associated with coefficient of thermal expansion between metal and ceramic components.

BRIEF DESCRIPTION OF THE DRAWINGS

For a better understanding of the invention, reference may be made to the exemplary embodiments shown in the accompanying drawings, which.

DESCRIPTION OF THE PREFERRED EMBODIMENTS

Figure 1:
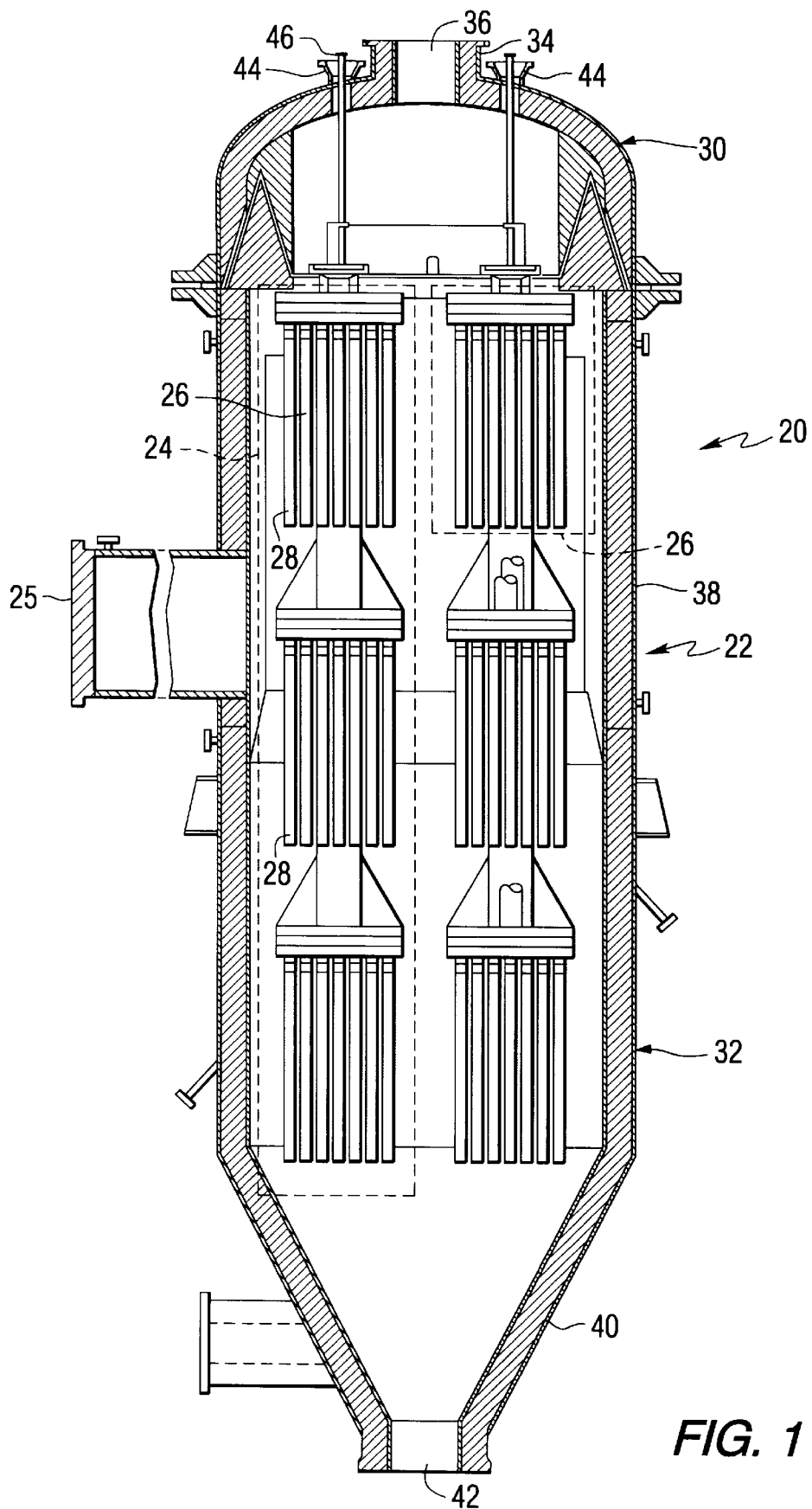
FIG. 1 is a longitudinal section view of a pressure vessel incorporating a filter assembly in accordance with the present invention.

FIG. 1 shows a filtering apparatus 20 for separating particulate matter from a gas stream. This apparatus includes a pressure vessel 22 in which there are mounted a plurality of clusters 24 comprising a plurality of filter element arrays 26. These filter element arrays 26 include a plurality of metallic filter elements 28.

The pressure vessel 22 has a dome-shaped head 30 and a body 32. The dome-shaped head 30 terminates in a linear tip 34, defining an exit opening or nozzle 36 for the filtered gas to be removed from the vessel 22. The body 32 includes a dirty gas inlet 25, where gas enters at a temperature of from about 1110° F. (600° C.) to about 1830° F. (1000° C.) and also usually contains about 2 vol. % to 25 vol. % water vapor in the form of steam, 200 ppmv to 0.5 vol. % sulfur in the form of $SO_3$, $SO_2$, $H_2S$ and other components such as C, chloride, alkali and the like which attack/oxidize most metals. The body also contains an upper part 38 having a generally circular cylindrical shape joined by a frusto-conical ash hopper 40 for receiving the particulate matter terminating in a linear tip defining an opening or nozzle 42 connected to an ash discharge line. A plurality of ports 44 extend from the dome-shaped head 30. The ports 44 provide a site for inserting instrumentation and for viewing the interior of the dome-shaped head 30 during shut-down periods. Through each port, tubes 46 for supplying a back pulse burst of gas for cleaning the filters 28 can be placed.

Figure 2:
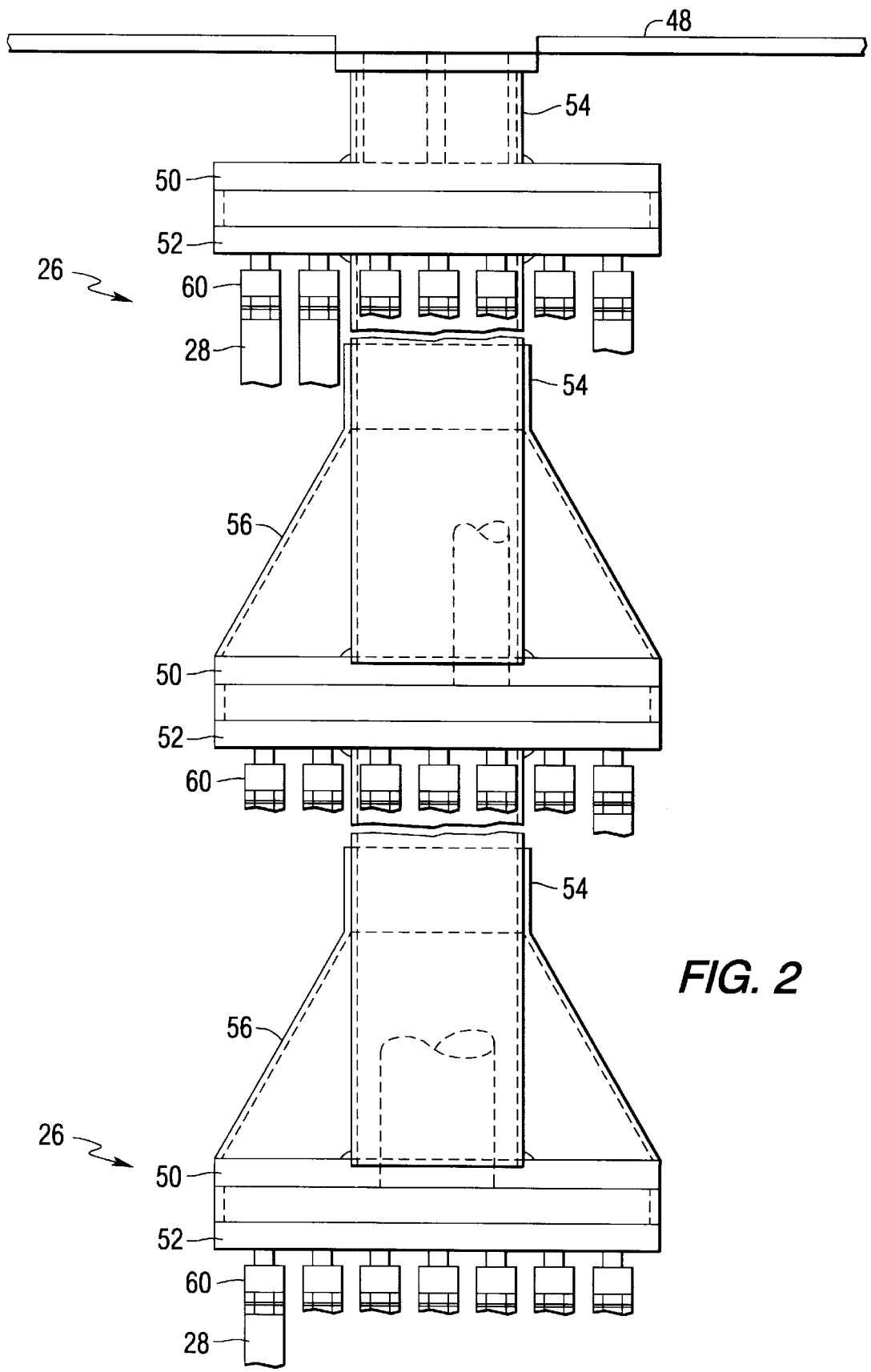
FIG. 2 is a side elevation view of an array of filter assemblies, including filter elements, coupled to a tube sheet as shown in FIG. 1.

Referring to FIG. 2, the pressure vessel includes a tube sheet 48. The tube sheet 48 supports the plurality of filter element arrays 26. Each filter element array 26 comprises a manifold plenum consisting of an upper plate 50 and a lower plate 52 and side plate. In accordance with the present invention, each filter element 28 is held by a filter assembly 60 and coupled to the corresponding lower plate 52 of the manifold plenum. The filter assemblies 60 are integrated into a structural unit by plenum support pipes 54. Each plenum support pipe 54 is secured centrally within the pressure vessel 22. A dust shed or particle-deflector 56 having a generally frusto-conical shape is also shown.

Figure 3:
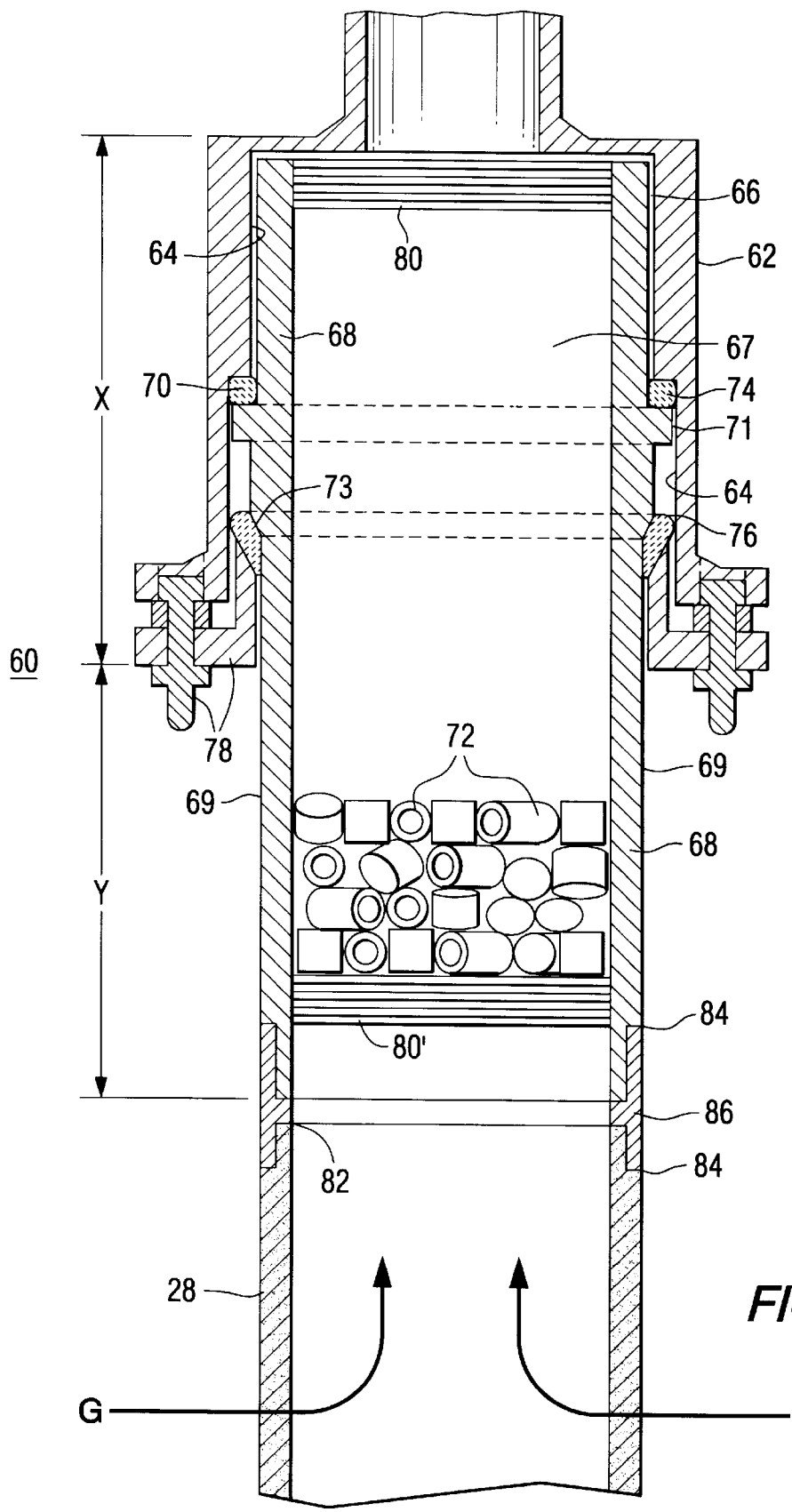
FIG. 3, which best shows the invention, is a sectional view of a filter assembly, including a one piece, all metal fail-safe/regenerator device, and having only one essential seal in accordance with the present invention, employed with a weld-connected, porous metallic hollow filter.

The preferred filter assembly 60 of the present invention for use with a hollow, porous, metallic, "superalloy" type, tube filter element 28 will now be described. Referring to FIG. 3, the filter assembly 60 provides a filtering means and a particulate barrier between the clean gas passing through the filter and dirty gas surfaces of the filter. In FIG. 3, the filter assembly 60 is shown assembled. The filter assembly 60 comprises a filter housing 62 having a certain axial length X, and peripheral sidewalls 64 which define an interior chamber generally shown as 66, an extended, one piece, all metal, fail-safe/regenerator device 68, having sidewalls 69, and interior volume 67, permanently or removably installed within the interior chamber 66 of the filter housing 62.

The fail-safe/regenerator device 68 has an outward extending radial flange 71 within the filter housing 62 which flange 71 is essential for seating the sole essential sealing means gasket 70. This gasket 70 is installed within the interior chamber 66 between the fail-safe/regenerator device sidewalls 69 and the filter housing sidewalls 64 next to and above the flange 71, positioned as shown in FIG. 3 near the top of the device. The flange 71 can be machined square, at right angles to wall 69, as shown, or it can be bevelled at the bottom. Gasket 70 is the sole required particulate sealing means needed eliminating at least one essential seal required in the prior art and dramatically simplifying sealing. However, usually a bottom or bottommost compliant gasket 76 is used between the fail-safe/regenerator device sidewalls at onward tapered position 73 and the filter housing sidewalls 64 to adjust the "play" between the fail-safe/regenerator device and the filter housing. All other sleeves and the like previously used are now not necessary. Additionally, a cast nut locking means 78 provides a coupling means. The outer shell of the fail-safe/regenerator device is usually made of stainless steel and has a density of from about 95% to 100% of theoretical density (0% to about 5% porous).

The fail-safe/regenerator device 68 extends a distance Y, which can be substantially beyond the axial length X of the filter housing. This extended fail-safe/regenerator device provides more interior volume for round, oval, square, needle-like fibers, etc. solid or hollow metal heat transfer media 72, which are shown only at the bottom of the fail-safe/regenerator device for simplicity but can fill the entire volume 67 of the fail-safe/regenerator device 68 between two combination sets, 80 at the top of the device and 80' at the bottom of the device. Set 80 consists of perforated plates and coarse screen and fine wire mesh or screen. These screens can be made from a corrosion resistant alloy such as stainless steel, Alloy HR230, and the like. The heat transfer media are usually short hollow tubes, as shown in some of the media 72 in FIG. 3. Usually, two layers of screens plus a perforated plate enclose the heat transfer media 72, and also in the event of filter failure, trap particulate matter between them and prevent collected particulate matter from being liberated into the clean gas stream during normal process operation, or back pulsed into filter elements 28 and/or the interior of the filter vessel during pulses of reverse gas flow cleaning. The increased volume of the bed of heat transfer media 72, shown in FIG. 3, provides a more effective thermal regenerator to heat the back pulses of cold gas during reverse flow cleaning of the filter element, where gas flow G shown is reversed, so cold gas contact with other parts of the filter assembly 60 is minimized. This increased heat transfer volume can be very important with use of higher temperature feed gases. Preferably, the bed of heat transfer media 72 comprises Raschig rings made of type 310 stainless steel having, just as an example, a 0.25 inch (0.635 cm) diameter and a 0.25 inch (0.635 cm) length.

Extending below the filter housing, the fail-safe/regenerator device 68 typically comprises a tube with an outside diameter as at 69 of approximately 60 mm and an inside diameter of approximately 54 mm. Within the peripheral sidewalls 64 of the filter housing 62, the fail-safe/regenerator device 68 typically comprises a tube with an outside diameter as at 69 of approximately 70 mm, and an inside diameter that ranges from about 40 to about 68 mm. The radial flange 71, in order to provide a good seat for seal 70, will have an outside diameter preferably between about 75 mm and 80 mm, that is about 20% to about 35% larger diameter. The filter housing 62 and outer shell of the fail-safe/regenerator device 68 are made of a dense material that can withstand the relatively high temperatures that are reached in a particular system and possess strength and durability, usually standard 310 stainless steel.

Figure 4:
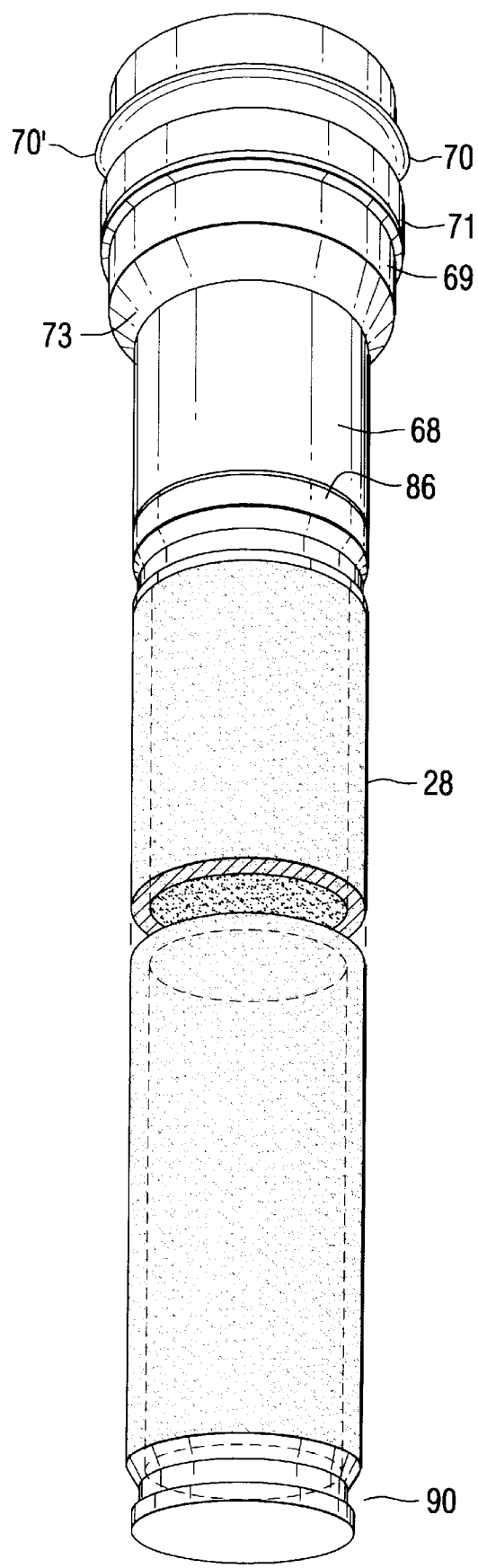
FIG. 4 is a three-dimensional view of the fail-safe/regenerator device and attached filter shown in FIG. 3.

As is shown in FIG. 3, the filter element 28 has a weldable open end 82 and a weldable closed end cap 90 (shown in FIG. 4). The weldable open end 82 of the filter element body is welded at the bottom of the fail-safe/regenerator device at point 84, either directly, or, since there is a difference in density and porosity between the fail-safe/regenerator walls 69 and the porous filter walls, the weld may be to an intermediate metal adapter ring structure 86, as shown. Such an intermediate adapter ring is advantageous because it may be chosen of composition readily welded to both filter and fail-safe/regenerator device. Gas flow G is also shown as would be the case during normal filter operation. The adapter ring need not have an interlocking structure as shown and can be a simple, flat, end ring. The weldable closed end cap 90 is a dense metal end cap, which is welded directly to the porous filter walls, or welded to an intermediate metal adapter ring structure as 86 (shown in FIG. 4). Such an intermediate adapter ring is advantageous because it may be chosen of composition readily welded to both filter and closed end cap. FIG. 4 shows a three dimensional view of the machined, one piece, all metal, fail-safe/regenerator device 68, with welded metal filter element body 28. The essential seal 70' would be placed at location 70 above annular extending, machined radial flange 71. This fail-safe/regenerator device should be insertable into most other prior units in place in the field, for quick retrofit.

The porous metallic type filter body 28 can be made from a wide variety of metal "superalloys" including intermetallic materials such as metal-based aluminides (Ti-Al, Ni-Al, Fe-Al). Table 1 lists commercial metals (comparative alloys=*) and those of the desired type, for use as the filter element body:

TABLE 1

| Alloy | Nominal Composition (wt %) | | | | | | | | | | | | | | |
|---|---|---|---|---|---|---|---|---|---|---|---|---|---|---|---|
| | Co | Cr | Ni | W | Fe | C | Si | Mn | La | B | Mo | Al | Zr | Y | Other |
| 316L Stainless* | | 16.4 | 10.2 | | 69 | 0.02 | 0.5 | 1.6 | | | 2.1 | | | | N-0.05 |
| 310 Stainless* | | 25 | 20.5 | | Bal | 0.05 | 0.50 | 1.6 | | | 0.75 | | | | P-0.04 S-0.03 Cu-0.5 |
| Inconel 600* | | 15.5 | Bal | | 8 | | 0.2 | 0.3 | | | | 0.2 | | | Ti-0.2 |
| Hastelloy X* | 1.7 | 22 | 47 | 0.6 | 19 | 0.08 | 0.3 | 0.5 | | | 9 | | | | |
| Haynes HR-160 | 29 | 28 | Bal | | 1.5 | 0.05 | 2.75 | 0.5 | | | | | | | |
| Haynes 556 | 18 | 22 | 20 | 2.5 | Bal | 0.1 | 0.4 | 1.0 | 0.02 | | 3 | 0.2 | 0.02 | | Ta-0.6 N-0.2 |
| FeCrSi | | 35–45 | | | Bal | | 2 | | | | | | | | |
| FeCrAlY | | 22.5 | | | Bal | | | | | | | 5 | | 0.5 | |
| Ti, Ni, Fe—Al | | | | | | | | | | | | | | | |
| Haynes 188 | Bal | 21–23 | 20–24 | 13–15 | 3 | 0.05–0.15 | 0.20–0.50 | 1.25 | 0.03–0.12 | 0.015 | | | | | P-0.020 S-0.015 |
| Haynes 230 | 5 | 22 | 57 | 14 | 3 | 0.1 | 0.4 | 0.5 | 0.02 | 0.015 | 2 | 0.3 | | | |
| Haynes 214 | | 16 | 75 | | 3 | 0.05 | 0.5 | | 0.01 | | | 4.5 | 0.1 | 0.01 | |
| RA 333 | 3 | 25 | 45 | 3 | 18 | 0.05 | 1.0 | 1.5 | | | 3 | | | | |
| RA 85H | | 18.5 | 14.5 | | 61 | 0.20 | 3.5 | 0.8 | | | | 1.0 | | | |
| HR-120 | 3 | 25 | 37 | 2.5 | 33 | 0.05 | 0.6 | 0.7 | | 0.004 | 2.5 | 0.1 | | | N-0.2 Cb-0.7 |
| HR-160 | 29 | 28 | Bal | | 1.5 | 0.05 | 2.75 | | | | | | | | |

*Comparative example
RA = Rolled Alloys
HR = Haynes Alloys

The porosity of the filter element body will range from approximately 40% porous to approximately 95% porous (5%–60% of theoretical density), preferably approximately 60% porous to approximately 90% porous. This porosity may be graded, for example 40% porous at outer gas contacting surface and 90% porous at the interior surface. The useful metallic type materials generally will not be of a simple stainless type. At high temperatures in the presence of steam and sulfur compounds, chlorides, or alkalis in the dirty feed gas, porous-structured stainless types will soon corrode. This leads to the use of "superalloy" types, which term in here meant to include HR, RA, FeCrSi, FeCrAlY, and intermetallic alloys, for example Ti-Al, Ni-Al, and/or Fe-Al, which have enhanced corrosion resistance in porous form (as particles, fibers, reticulated foams, etc.) in the presence of steam and sulfur compounds, chloride, or alkalis at about 1110° F. (600° C.) to 1830° F. (1000° C.). Usually the useful superalloy type will contain Cr and Si, Ni, or Co, and Al, Y, B, La, or Mo.

For use in coal-based applications, commercially available porous filter elements manufactured from 316L, 310, Inconel 600, and/or Hastelloy X, have demonstrated, a maximum operating use temperature of 1000° F. (540° C.), embrittlement and significant change within the porous microstructure, lack of resistance to oxidizing or reducing environments containing sulfur (i.e., $SO_3$, $SO_2$, $H_2S$), or rapid loss of strength.

Another problem in these systems is "metal dusting" in gasification applications. Metal dusting results from reaction of the metal media with carbon in the gas stream to form metastable carbides which subsequently decompose, forming carbon and metal particulates. In a gas flowing system, the particulates are removed, leading to the formation of pits, crevices, and metal wastage, ultimately reducing the life of the high surface area metal media. The concentration of chromium and silicon in RA 333, RA 85H and HR-160, provide resistance to metal dusting during use in gasification applications. Hayes 188, 230, and 214 exhibit high oxidation resistance at elevated temperatures during exposure in an oxidizing or combustion gas environment. For Hayes 214, enhanced oxidation resistance is attributed to the formation of a tightly adhering alumina protective oxide layer at temperatures >1750° F. (955° C.), or a mixed alumina-chrome oxide scale at temperatures <1750° F. (955° C.). For Haynes 188 and Haynes 230, the minute addition of lanthanum modifies and forms a protective oxide layer which tenaciously retards diffusion of gas species through the scale up to temperatures of 2100° F. (1150° C.).

Intermetallics as $Fe_3Al$ (iron aluminide), or other possibilities such as Ni-Al or Ti-Al media may promote growth of an alumina-enriched surface layer that provides enhanced oxidation for use of the media in advanced coal-based combustion systems. Similarly, oxidation resistance is known to be enhanced through the use of FeCrAlY, where yttrium further stabilizes the chromia-alumina-enriched outer surface protective scale. Haynes 160 forms a chromium-silicon-based protective oxide scale, and would be useful in coal gasification environments, as RA 85H. Haynes 556 exceeds the oxidation resistance of Hastelloy X, and is frequently considered to be nearly as stable as Haynes 214, 230 and/or 188.

The filter element body can be made from sintered metal particles, sintered metal fibers, a combination of sintered metal particles and fibers, or it can be of a reticulated foam or wire mesh laminate design providing a structured network of interlocking metallic form. Preferably the sintered metal particle and reticulated foam filter element body will have sufficient strength to be manufactured as a homogenous, monolithic unit. Sintered metal fiber filters may be homogenous monoliths, or units constructed with an outer and/or inner structural support to provide enhanced strength and/or support to the filter media. The filter media itself may perform the function of filtration, or it may have a thin filter membrane disposed on the outer and/or inner surface of the filter element body.

The following non-limiting example is presented to further illustrate the invention.

EXAMPLE

The materials used to construct the fail-safe/regenerator units were chosen primarily on the basis of high temperature oxidation resistance. Type 310S stainless steel was selected for all parts of the fail-safe/regenerator with the exception of the fine mesh screens. Laboratory oxidation data for Type 310S at 1800° F. (980° C.) after 1008 hours indicated that the average metal affected (i.e., metal loss plus internal penetration) was 0.28 mm (0.0011 inch). Such superficial attack is acceptable for the relatively thick section body parts. In contrast, however, the fine mesh screen is made by weaving wire of 1.4 mm (0.0055 inch) diameter. If 310S were used in these conditions, then 40 percent of the wire diameter (64 percent of the volume) would be expected to be affected. Instead, Haynes Alloy 25 (Alloy L605) was selected for the fine mesh, and during exposure to the same oxidation conditions, 25 percent of the wire diameter (44 percent of the volume) would be expected to be affected. Alloy Haynes 230 is also being considered, as is RA 85H. The fail-safe/regenerator device was inserted into a metal filter housing, providing a filter assembly and tested in hot coal gas with excellent results.

The present invention may be embodied in other forms without departing from the spirit or essential attributes thereof, and accordingly, reference should be made to both the appended claims, and to the foregoing specification as indicting the scope of the invention.

What is claimed is:

1. A filter assembly and a filter element system, the filter assembly for holding the filter element including a porous metallic type body having two opposing ends, one defining a weldable open end and the other defining a closed end; the filter element body having a uniform diameter, said filter assembly and filter element system comprising:

(a) a filter housing, said filter housing having a certain axial length and having a peripheral sidewall, said sidewall defining an interior chamber;

(b) a one piece, all metal, fail-safe/regenerator device, having a top and bottom end, disposed within the interior chamber of the filter housing, extending beyond the axial length of the filter housing, said device containing an outward extending radial flange near the top of the device within the filter housing, for seating an essential sealing means, the device also having heat transfer media disposed between a screening means at the top of the device within the filter housing and a screening means at the bottom of the device;

(c) one essential sealing means consisting of one compliant gasket separate and apart from the filter housing, said compliant gasket positioned next to and above the outward extending radial flange of the fail-safe/regenerator device said gasket effective to provide a seal between the filter housing and the fail-safe/regenerator device; and (d) a porous metallic corrosion resistant superalloy type filter element body welded at the bottom of the metal fail-safe/regenerator device outside of the filter housing.

2. The filter assembly of claim 1, where the filter element body is from about 40% porous to about 95% porous and the superalloy type filter element is corrosion resistant in porous form, in the presence of steam and sulfur compounds, chlorides, or alkalis at about 600° C. to 1000° C.

3. The filter assembly of claim 1, where the filter element body is attached to the fail-safe/regenerator device through a metal adapter ring structure.

4. The filter assembly of claim 1, where metal heat transfer media fill the volume of the fail-safe/regenerator device between the top and bottom screening.

5. The filter assembly of claim 1, where the diameter of the radial flange is from about 20% to about 35% increased diameter over the diameter of the outer diameter of the fail-safe/regenerator device.

6. The filter assembly of claim 1, containing no ceramic components with the exception of compliant gaskets.

7. The filter assembly of claim 1, where the filter element body is from about 60% porous to about 90% porous and made of superalloy metal selected from either sintered powder, fibers, reticulated foam or laminates.

8. The filter assembly of claim 1, adapted for use in an environment of particle contaminated gas, steam and sulfur compounds, chlorides or alkalis at a temperature of from about 600° C. to 1000 ° C.

9. A one piece all metal, fail-safe/regenerator device and filter element system said device containing an outward extending radial flange for seating a sealing means, the device also having heat transfer media disposed between a screening means at the top of the device and a screening means at the bottom of the device, where a porous metallic corrosion resistant superalloy type filter element body is welded at the bottom of the metal fail-safe/regenerator device.

10. The fail-safe/regenerator device of claim 9, where the filter element body is from approximately 40% porous to approximately 95 % porous and the superalloy type filter element is corrosion resistant in porous form in the presence of steam and sulfur compounds, chlorides, or alkalis at about 600° C. to 1000° C., the filter element is attached to the fail-safe/regenerator device through a metal adapter ring structure, and the diameter of the radial flange is from about 20% to about 35% increased diameter over the diameter of the outer diameter of the fail-safe/regenerator device.

* * * * *